(12) United States Patent
Ros et al.

(10) Patent No.: US 9,161,651 B2
(45) Date of Patent: Oct. 20, 2015

(54) DUAL DRUM SPIRAL OVEN

(71) Applicant: TS Techniek bv, Pijnacker Zuid-Holland (NL)

(72) Inventors: Michael Ros, Bergschenhoek (NL); Thomas F. Steentjes, Bleiswijk (NL)

(73) Assignee: TS TECHNIEK BV, Zuid-Holland (NL)

( * ) Notice: Subject to any disclaimer, the term of this patent is extended or adjusted under 35 U.S.C. 154(b) by 169 days.

(21) Appl. No.: 13/750,540

(22) Filed: Jan. 25, 2013

(65) Prior Publication Data

US 2013/0220145 A1  Aug. 29, 2013

Related U.S. Application Data

(60) Provisional application No. 61/591,717, filed on Jan. 27, 2012, provisional application No. 61/591,955, filed on Jan. 29, 2012, provisional application No. 61/593,326, filed on Feb. 1, 2012.

(51) Int. Cl.
*A47J 37/04* (2006.01)
*A47J 27/16* (2006.01)
*A21B 1/48* (2006.01)

(52) U.S. Cl.
CPC . *A47J 27/16* (2013.01); *A21B 1/48* (2013.01); *A47J 37/043* (2013.01); *A47J 37/045* (2013.01)

(58) Field of Classification Search
CPC ........... A21B 1/48; F25D 13/06; F25D 25/04; A47J 37/045; A47J 27/16; A47J 37/043
USPC ............... 99/443 C, 474, 475, 479; 126/21 A
See application file for complete search history.

(56) References Cited

U.S. PATENT DOCUMENTS 3,905,760 A * 9/1975 Johansson et al. ............. 432/176
4,039,278 A * 8/1977 Denholm ....................... 432/144
4,118,181 A   10/1978 Onodera
(Continued)

FOREIGN PATENT DOCUMENTS

EP      0528593 A1   2/1993
EP      0953286 A1   11/1999
(Continued)

OTHER PUBLICATIONS

International Search Report for PCT/NL2013/050043, dated May 29, 2013, 5 pages.

*Primary Examiner* — Dana Ross
*Assistant Examiner* — John J Norton
(74) *Attorney, Agent, or Firm* — Klintworth & Rozenblat IP LLC

(57) ABSTRACT

In one aspect, an oven is provided and includes a drum oriented with a vertical axis and a motor for rotating the drum about the axis, a conveyor belt having a length helically surrounding the drum, and having an infeed end and outlet end, a chamber defined by walls surrounding the drum and the length of the conveyor belt, and a plenum within the chamber and being curved substantially concentrically with the drum. The plenum forms a substantially closed air pathway having an inlet at one end and an outlet at an opposite end passing air into the chamber. The oven also includes a fan arranged to circulate air within the chamber and force air into the plenum inlet, through the plenum and out of the plenum outlet, and a heat exchanger arranged in the plenum.

14 Claims, 11 Drawing Sheets

(56) References Cited

U.S. PATENT DOCUMENTS

| | | | |
|---|---|---|---|
| 4,191,881 A | 3/1980 | Ahlgren et al. | |
| 4,631,029 A | 12/1986 | Lanham et al. | |
| 4,689,303 A * | 8/1987 | Kraft et al. | 435/303.1 |
| 4,812,622 A * | 3/1989 | Takeda et al. | 219/400 |
| 5,189,948 A | 3/1993 | Liebermann | |
| 5,243,962 A | 9/1993 | Hwang | |
| 5,322,007 A * | 6/1994 | Caridis et al. | 99/443 C |
| 5,329,916 A * | 7/1994 | Lygum | 126/21 A |
| 5,394,791 A * | 3/1995 | Vallee | 99/427 |
| 5,460,260 A | 10/1995 | Ochs et al. | |
| 5,615,603 A * | 4/1997 | Polin | 99/331 |
| 5,702,245 A | 12/1997 | London | |
| 5,850,781 A * | 12/1998 | Kuenen | 99/443 C |
| 6,065,463 A | 5/2000 | Martin | |
| 6,095,805 A | 8/2000 | Kuenen | |
| 6,138,660 A | 10/2000 | Middleton, Jr. | |
| 6,244,168 B1 | 6/2001 | van de Vorst et al. | |
| 6,247,922 B1 | 6/2001 | Kuenen | |
| 6,494,131 B2 * | 12/2002 | van de Vorst et al. | 99/443 C |
| 6,658,993 B2 | 12/2003 | Kuenen | |
| 6,689,407 B2 | 2/2004 | Shefet et al. | |
| 6,691,698 B2 * | 2/2004 | Gunawardena et al. | 126/21 A |
| 6,713,107 B2 | 3/2004 | Shefet et al. | |
| 7,107,899 B2 | 9/2006 | Nothum, Jr. | |
| 2011/0168689 A1 * | 7/2011 | Kuenen | 219/392 |
| 2011/0226137 A1 * | 9/2011 | van der Eerden et al. | 99/477 |
| 2011/0247355 A1 | 10/2011 | McCormick et al. | |

FOREIGN PATENT DOCUMENTS

| | | |
|---|---|---|
| EP | 1069387 A1 | 1/2001 |
| EP | 1688687 A1 | 8/2006 |
| EP | 2135509 A1 | 12/2009 |
| FR | 2428977 A1 | 1/1980 |
| GB | 2096878 A | 10/1982 |
| WO | 99/57496 A1 | 11/1999 |
| WO | 2006/049492 A1 | 5/2006 |
| WO | 2009/084949 A2 | 7/2009 |

* cited by examiner

DUAL DRUM SPIRAL OVEN

This application claims the benefit of U.S. Provisional Application 61/591,717, filed Jan. 27, 2012; U.S. Provisional Application 61/591,955 filed Jan. 29, 2012 and U.S. Provisional Application 61/593,326, filed Feb. 1, 2012.

BACKGROUND OF THE INVENTION

Various spiral oven systems are known.

For example, U.S. Pat. No. 5,850,781 describes a multi-heating zone, single spiral oven. A spiral conveyor helically winds around a rotating drum. Heating is provided in zones within the oven. The zones are arranged vertically, i.e., an upper zone and a lower zone. Each zone has at least one ventilation device and heating device for circulating hot air through the zone. Each zone preferably has two ventilators, each with a heating device, which cover approximately half of each spiral conveyor winding.

U.S. Pat. Nos. 7,107,899 and 5,329,916 describe dual spiral ovens. In these patents two rotating drums within the oven are helically surrounded by conveyors wherein the output of one spiral conveyor communicates products onto the input of the next spiral conveyor. Heating elements in U.S. Pat. No. 7,107,899 are arranged as helical electrical coils or hollow tubes that underlie the spiral conveyor. The heating elements in U.S. Pat. No. 5,329,916 are arranged in overhead air ducts.

The present inventor has recognized that it would be desirable to provide a compact spiral oven that provides an optimized and efficient cooking.

SUMMARY OF THE INVENTION

The exemplary embodiment of the invention provides an oven having a rotating drum and a conveyor surrounding or wrapping the drum helically for transporting products to be cooked along a path from an inlet of the oven to an outlet, a ventilator for circulating air through the oven, and a heat exchanger for heating the air circulated by the ventilator. A housing provides a chamber that surrounds the drum and the conveyor that wraps the drum. A curved plenum is configured adjacent to the chamber wherein the plenum is curved substantially concentrically with the drum. The ventilator forces air in a tangential direction with regard to the drum through the plenum, through a heat exchanger that is configured to curve with the curve of the plenum. The heat exchanger preferably comprises transversely arranged hollow tubes that contain a circulating thermal fluid that is heated outside of the oven.

Preferably, the oven includes two drums and two spiral conveyors that surround each of the drums respectively. The output of one conveyor delivers product being cooked to an input of the next spiral conveyor.

The oven is designed for cooking a high amount of meat and chicken products.

The drums form the largest components of the system, and provide the main source of drive for the conveyor belt, which can be 120 meter in length. The spiral conveyor system can be configured with the conveyor belt entering at the bottom of the drum and exiting at the top. Alternately, the in-feed and out-feed of the spiral conveyors can be the opposite of this arrangement. During the belt's helical travel, its edge is held in tight contact with the drum, so that the friction created by the wraps of the belt around the drum is sufficient to drive the belt through the system. The drum is driven from underneath by an electric motor and can be either direct or chain-driven. The mechanism that keeps the belt tight against the drum is a secondary drive, or take-up or auxiliary drive. The auxiliary drive provides just enough pull on the belt to keep the belt in tight contact with the drum and to help set belt speed, not to provide the driving force to the belt. This keeps belt tension low.

Numerous other advantages and features of the present invention will be become readily apparent from the following detailed description of the invention and the embodiments thereof, and from the accompanying drawings.

DETAILED DESCRIPTION

Figure 1:
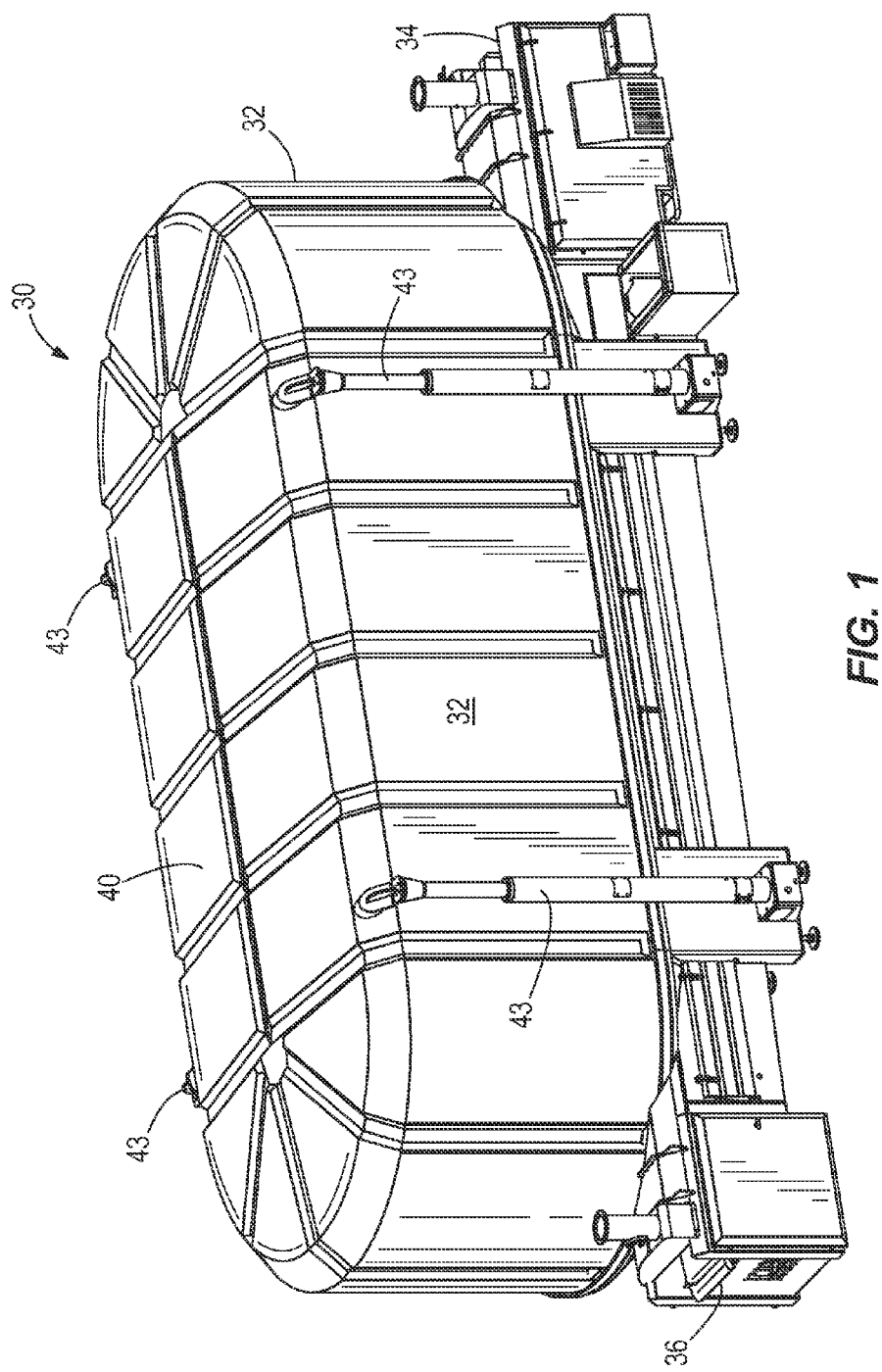
FIG. 1 is a front perspective view of the dual spiral oven according to one embodiment of the present invention.

While this invention is susceptible of embodiment in many different forms, there are shown in the drawings, and will be described herein in detail, specific embodiments thereof with the understanding that the present disclosure is to be considered as an exemplification of the principles of the invention and is not intended to limit the invention to the specific embodiments illustrated.

U.S. Pat. Nos. 5,850,781; 7,107,899 and 5,329,916 are all herein incorporated by reference where not inconsistent with the present disclosure.

FIG. 1 illustrates an oven 30 having a housing 32 and conveyor infeed station 34 and a conveyor discharge station 36. Products, such as chicken pieces are loaded onto the conveyor infeed station, pass through the housing 32 and are output at the conveyor discharge station 36. The housing includes a hood 40 that can be raise by four lifting jacks 43. The housing 32 provides outside walls that substantially enclose the oven.

Figure 2:
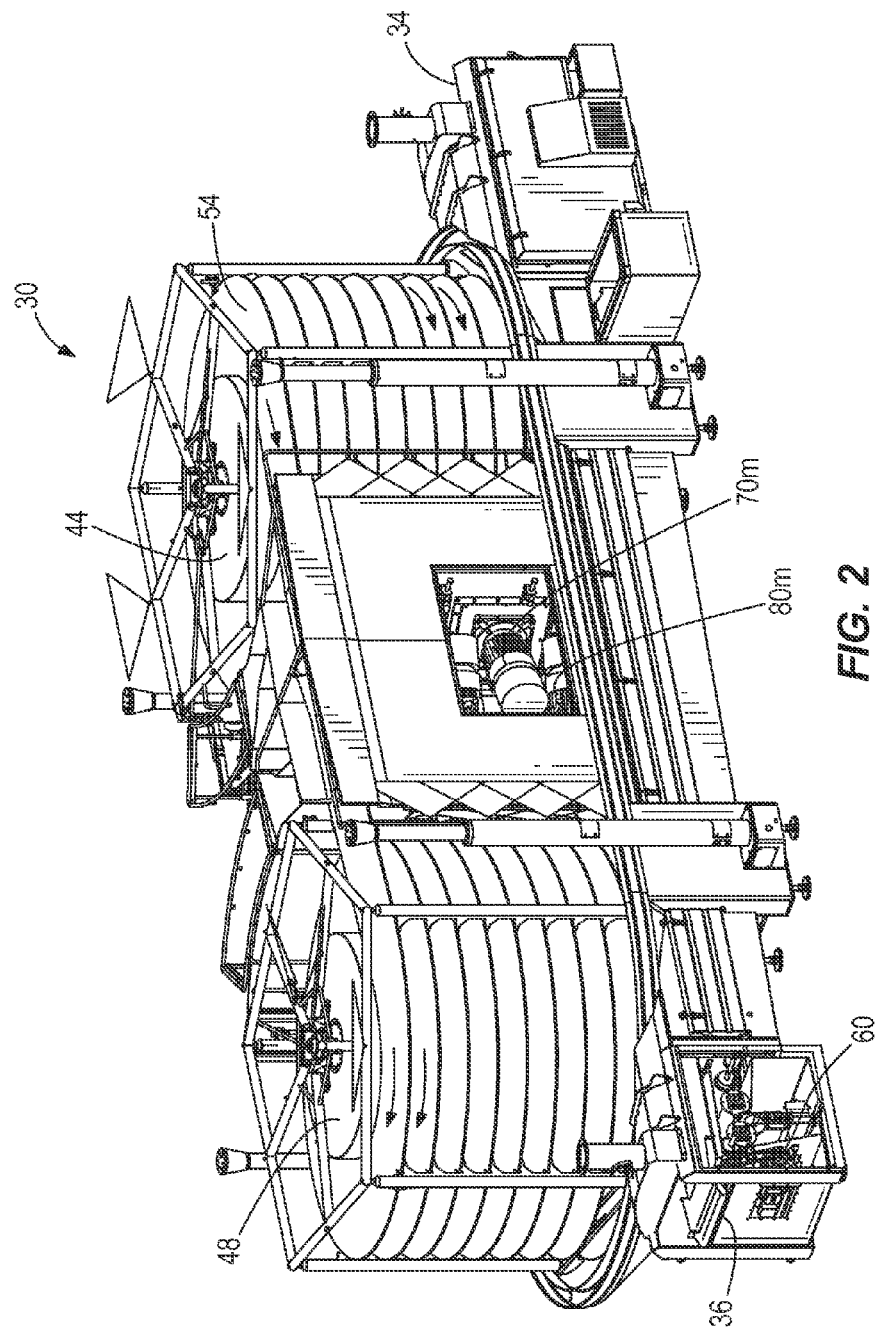
FIG. 2 is a front perspective view of the dual spiral oven of FIG. 1 with an outer skin or housing removed to view underlying components.
Figure 6:
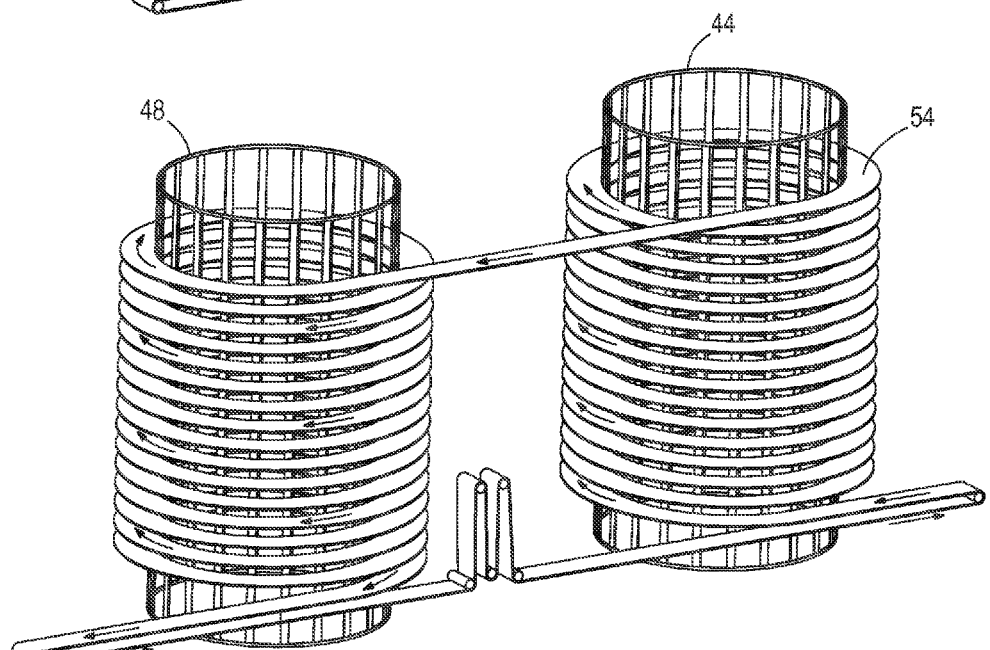

FIGS. 2 and 6 illustrate the oven with the housing removed for viewing underlying components. The oven comprises a first drum 44 and a second drum 48. Preferably, drums 44, 48 are solid cylinders. A conveyor belt 54, such as a stainless steel wire mesh belt, is a continuous belt that moves from the product infeed, and helically wraps around the first drum 44 and the second drum 48 and passes to the discharge station 36, and over a secondary drive 60 and back to the product infeed station 34.

The secondary drive 60 maintains a tension on the belt 54. The drums 44, 48 are rotated by a motor drive (not shown) and engagement of the drums and an inside edge of the belt 54 circulates the belts helically on the drums and between the infeed station 34 and the discharge station 36 and back.

Figure 3:
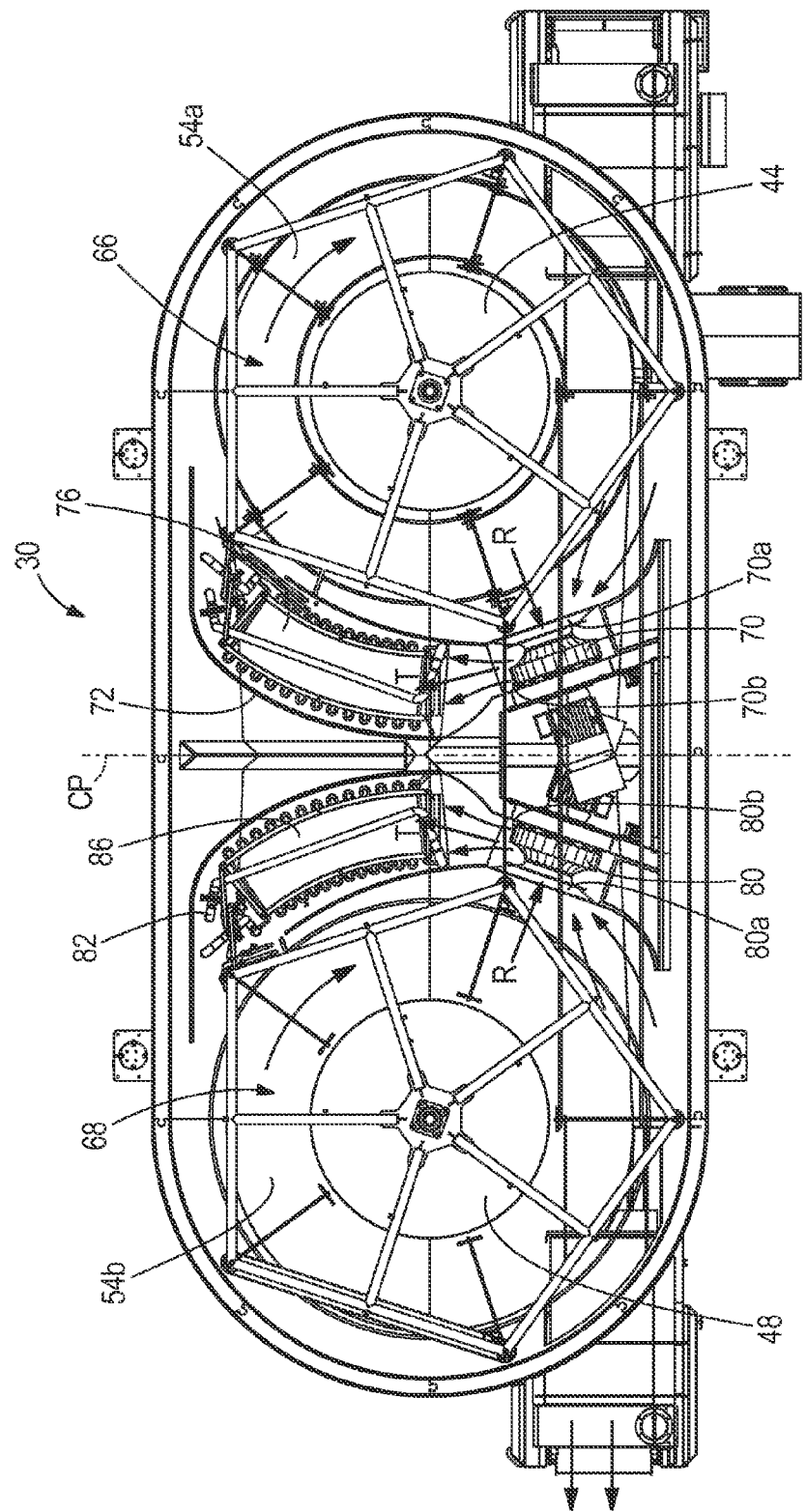
FIG. 3 is a schematic top view showing an air flow arrangement for the oven.
Figure 4:
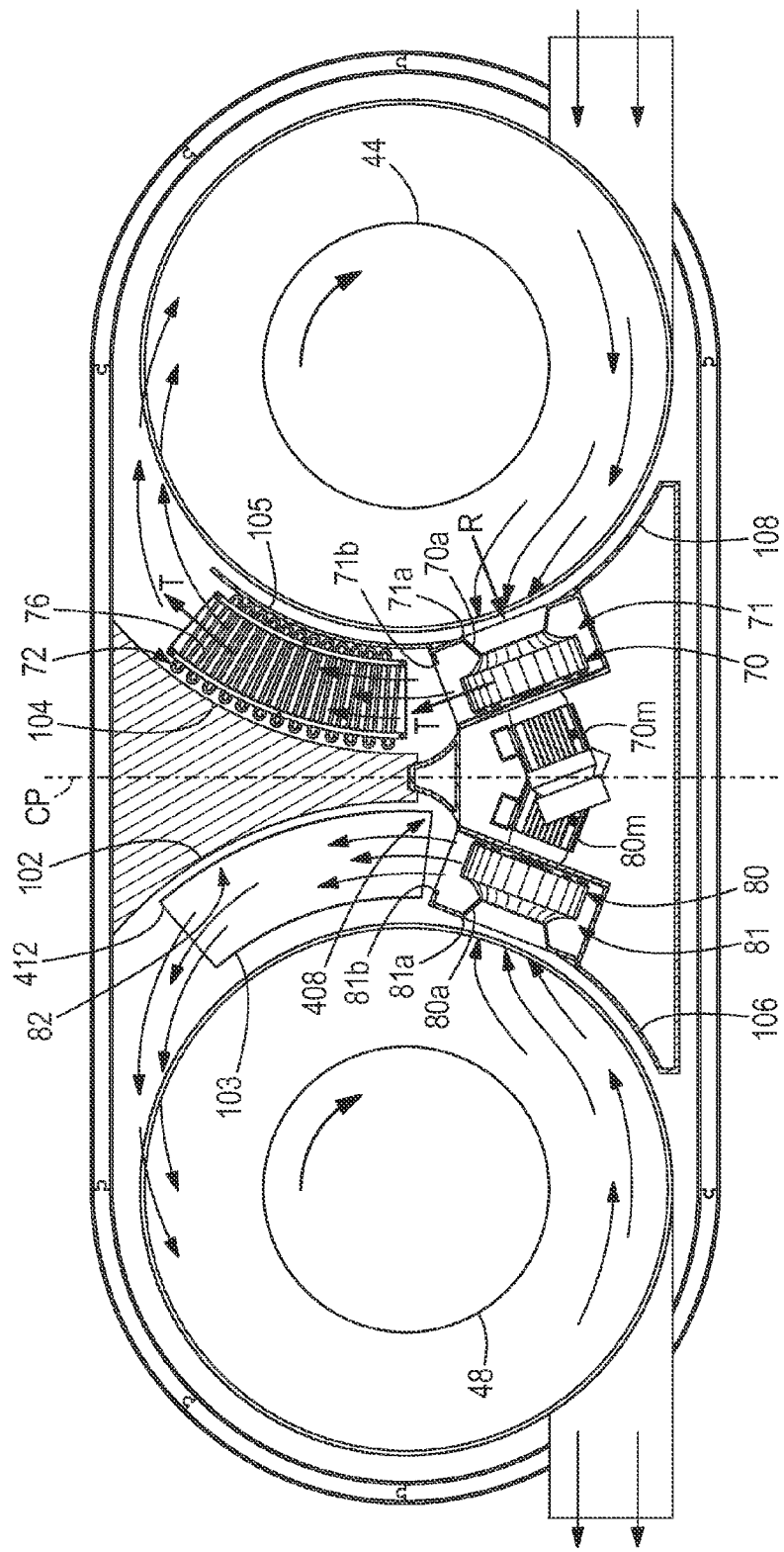
FIG. 4 is a further schematic top view showing the air flow arrangement in the oven.
Figure 5:
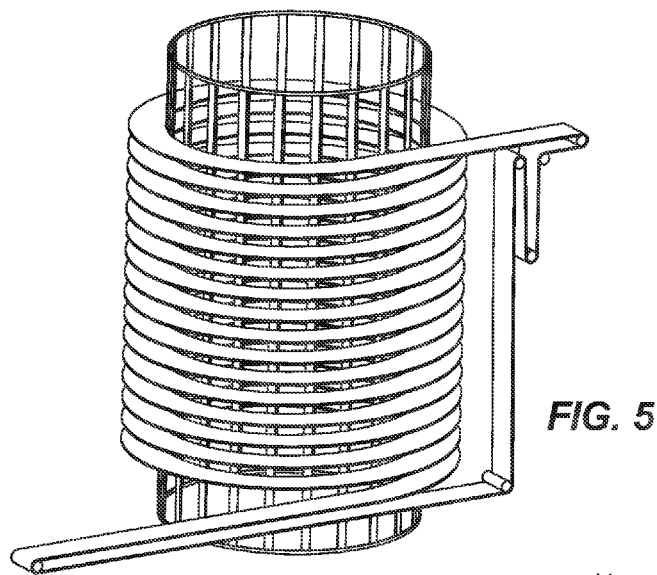
FIGS. 5 and 6 are schematic diagrams of spiral oven conveyor belts.
Figure 8:
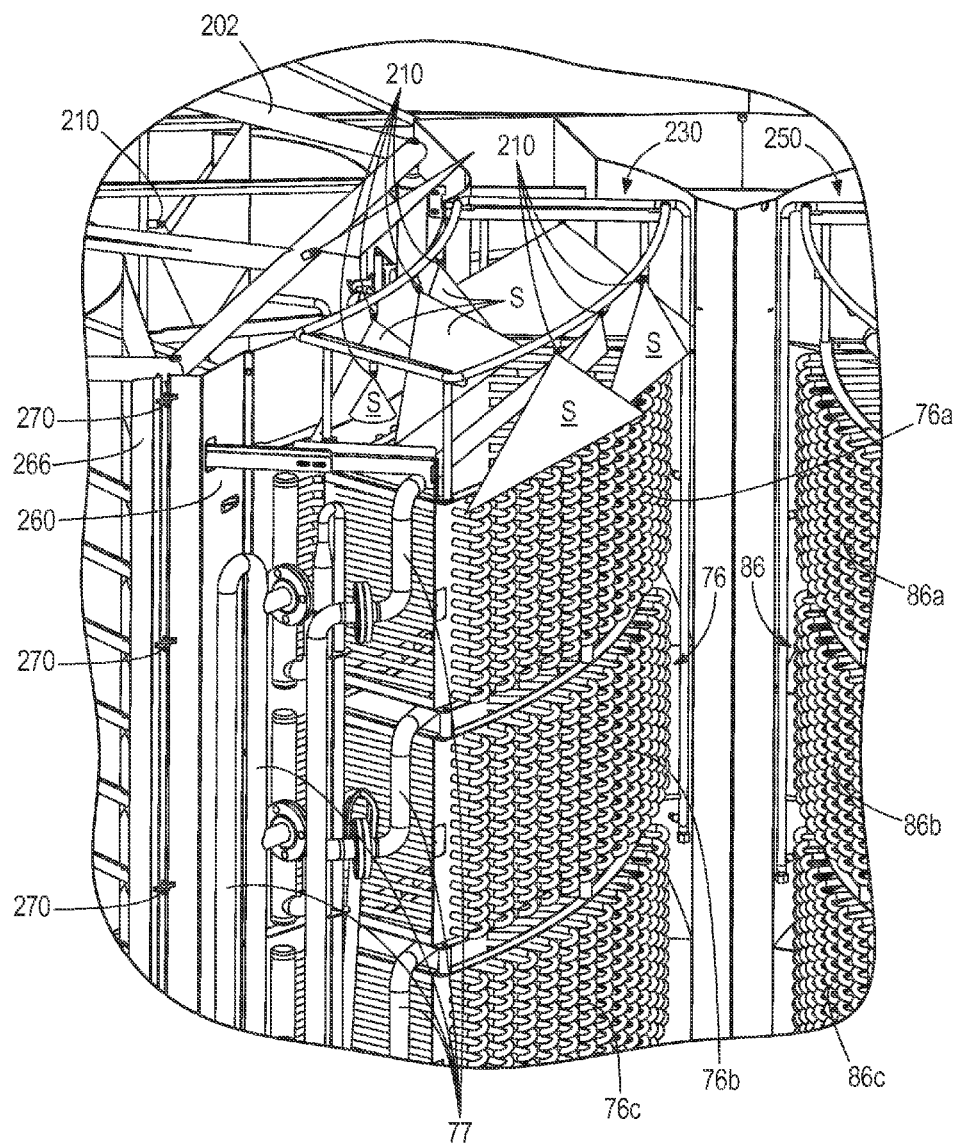
FIG. 8 is an enlarged perspective view taken generally along line 8-8 from FIG. 7 with some walls removed to view otherwise obscured parts.
Figure 9:
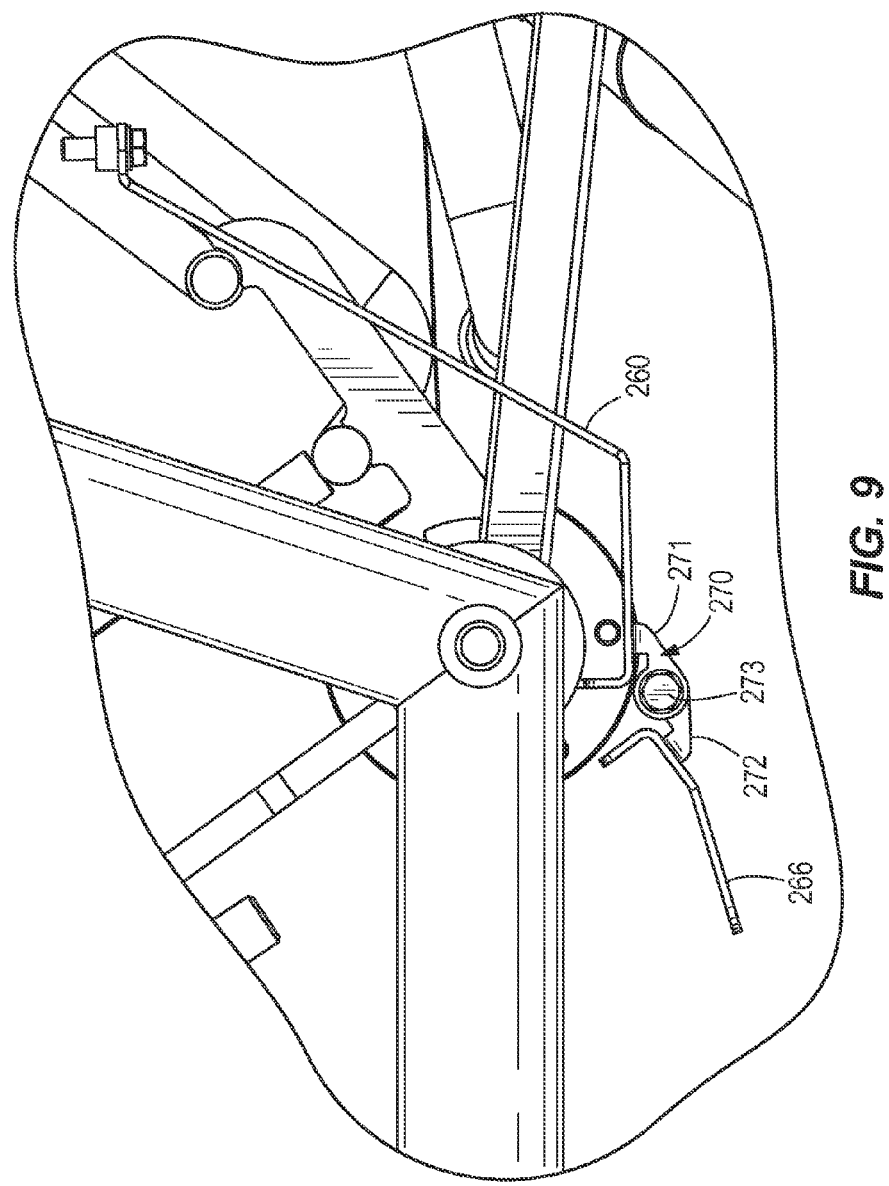
FIG. 9 is a top view taken from FIG. 8.

As shown in FIGS. 3 and 4, each drum and associated length of spiral conveyor is arranged in a separate cooking volume of the housing. The drum 44 and a first associated length 54a of spiral conveyor 54 are located in a first chamber 66 and the drum 46 and a second associated length 54b of spiral conveyor are located in a second chamber 68. The chamber 66 is heated by at least one ventilator or fan 70 contained in a substantially enclosed fan chamber 71. The fan 70 is driven by a motor 70m from outside the fan chamber. The fan 70 has a rotary axis approximately radially oriented to the circumference of the drum 44. The fan 70 draws air from chamber 66 in a substantially radial direction R into an inlet 70a. The fan 70 is mounted to the fan chamber 71 with the inlet 70a in registry with a fan chamber inlet opening 71a. The fan chamber inlet 71a is preferably a funnel or flared inlet, tapered toward the fan inlet, to reduce pressure drop. The air is forced by the fan (s) 70 through an outlet 71b of the fan chamber into a curved plenum 72 that has an inner curvature that substantially conforms to the outer circumference of the spiral belt 54a within the chamber 66. The plenum is curved substantially concentrically with the drum 44. The air is moved through the plenum in a tangential direction T. A curved heat exchanger 76 is located within the plenum that conforms in curvature to the curvature of the plenum 72 to maximize heat exchange surface area in the compact oven. The heat exchanger 76 is preferably comprised of tubes which are transversely oriented and which carry hot heat transfer fluid. The heat exchanger 76 can be made up of vertically aligned exchanger banks 76a, 76b, 76c, as shown in FIG. 8. The heat transfer fluid can be heated outside the oven by a gas or oil fired source, or an electric source, or the like. Heat transfer fluid is conducted to and from the heat exchanger banks 76a, 76b, 76c by pipes 77. The plenum 72 is designed to output heated air into the chamber 66 in the tangential direction T so that the air is circulated substantially around the chamber before returning the inlet of the fan 70.

Preferably two fans 70 are provided at different elevations but arranged identically when viewed from above, in plan. Both fans force air into the plenum 72 in the same way.

The chamber 68 is heated by at least one ventilator or fan 80 contained in a substantially enclosed fan chamber 81. The fan 80 is driven by a motor 80m from outside the fan chamber. The fan 80 has a rotary axis approximately radially oriented to the circumference of the drum 48. The fan 80 draws air from chamber 68 in a substantially radial direction R into an inlet 80a. The fan 80 is mounted to the fan chamber with the inlet 80a in registry with a fan chamber inlet 81a. The fan chamber inlet 81a is preferably a funnel or flared inlet, tapered toward the fan inlet, to reduce pressure drop. The air is forced by the fan (s) 80 through an outlet 81b of the fan chamber into a curved plenum 82 that has an inner curvature that substantially conforms to the outer circumference of the spiral belt 54b within the chamber 68. The plenum is curved substantially concentrically with the drum. The air is moved through the plenum in a tangential direction T. A curved heat exchanger 86 is located within the plenum that conforms in curvature to the curvature of the plenum 82 to maximize heat exchange surface area in the compact oven. The heat exchanger 86 is preferably comprised of tubes which are transversely oriented and which carry hot heat transfer fluid. The heat exchanger 86 can be made up of vertically aligned exchanger banks 86a, 86b, 86c as shown in FIG. 8. The heat transfer fluid can be heated outside the oven by a gas or oil fired source, or an electric source, or the like. Heat transfer fluid is conducted to and from the exchanger banks 86a, 86b, 86c by pipes 87. The plenum 82 is designed to output heated air into the chamber 68 in the tangential direction T so that the air is circulated substantially around the chamber before returning the inlet of the fan 80.

Preferably two fans 80 are provided at different elevations but arranged identically when viewed from above, in plan. Both fans force air into the plenum 82 in the same way.

The drums 66 and 68 are rotated clockwise when viewed from above in FIG. 3. The belt 54 in the chamber 66 circulates helically up the drum 44 and the belt in the chamber 68 helically circulates helically down the drum 48.

The structure of the fans, heat exchangers and plenums are mirror image identical across a vertical center plane CP of the oven 30. The air flow rotation direction in the chamber 66 is with the drum rotation and belt circulation direction, and the air flow rotation direction in the chamber 68 is counter to the drum rotation direction and belt circulating direction.

The chambers 66, 68 are defined by outside walls of the housing 32 and separated by inside walls 102, 104, 106, 108 (FIG. 4) provided in the housing 32. The walls 102, 104 are curved and form side walls of the plenums 72, 82 and extend vertically from a bottom wall of the housing to a top wall of the housing. Opposite sidewalls 103, 105 are curved and form side walls of the plenums 72, 82. Different cooking temperatures and conditions can be maintained within the chambers 66, 68, for controlled cooking. Products, such as chicken pieces are input into the infeed station 34, move on the conveyor 54 up the drum 44 across to the drum 48, and down the drum 48 to the discharge station 36. Hot cooking gas, such as air is introduced into the first and second chambers 66, 68 to cook the products while resident in the respective chambers 66, 68.

Figure 7:
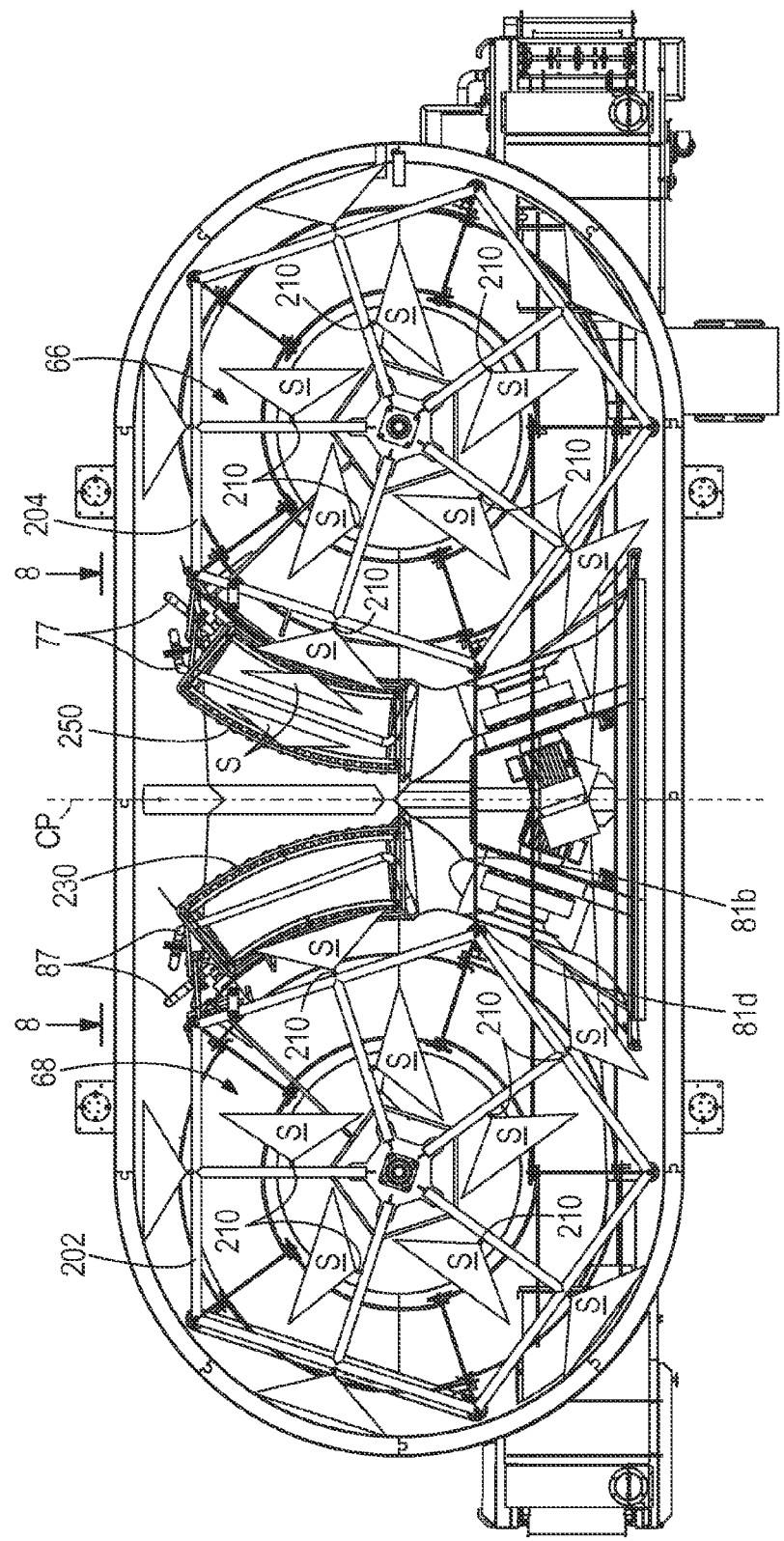
FIG. 7 is another schematic top view of the oven shown in FIG. 2.

FIG. 7 illustrates that each chamber 66, 68 includes an overhead cleaning manifold 202, 204. A pressurized water and soap mixture or solution is provided to the manifolds 202, 204 and periodically, during a cleaning procedure, a plurality of nozzles 210 spray water and soap mixture or solution S into the respective chamber.

Figure 10:
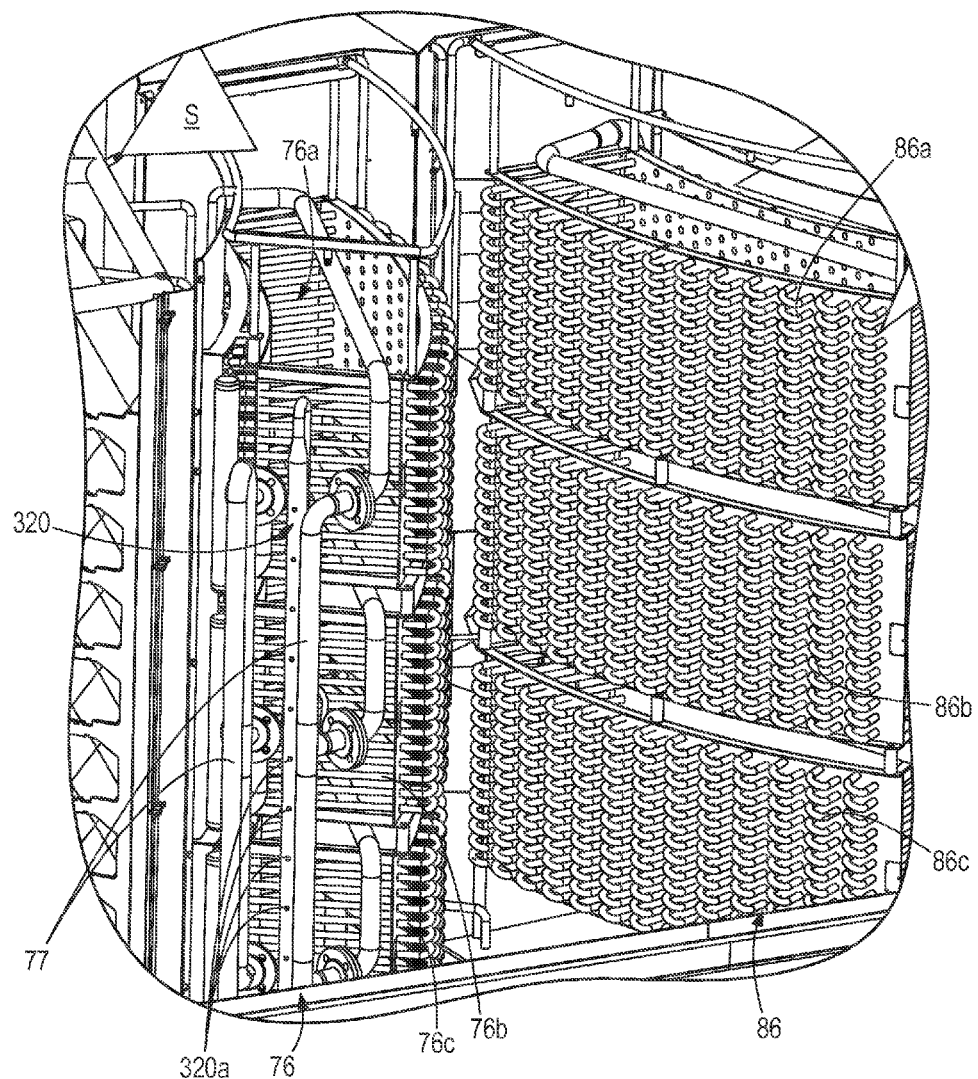
FIG. 10 is a perspective view similar to FIG. 8 but rotated a small amount with some walls removed to view otherwise obscured parts.
Figure 11:
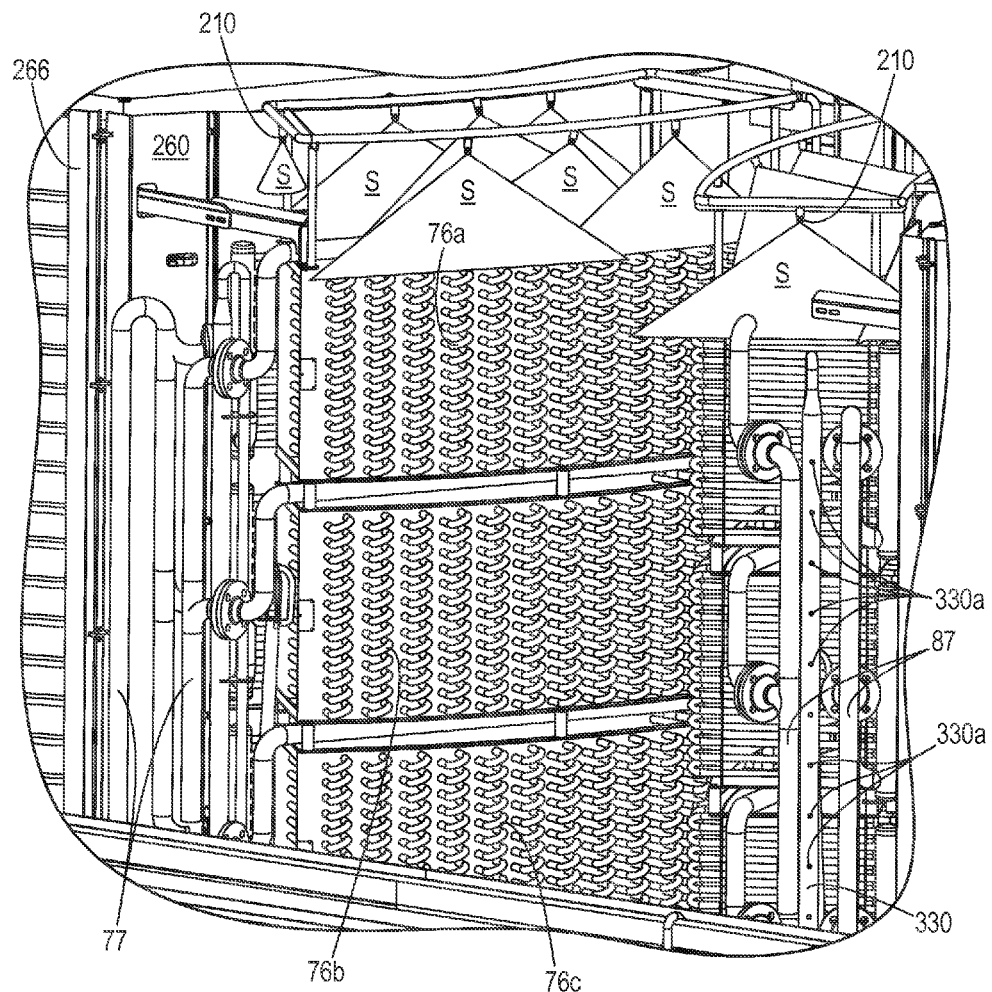
FIG. 11 is a perspective view similar to FIG. 10 but rotated a small amount with some walls removed to view otherwise obscured parts.

FIGS. 8, 10 and 11 illustrate construction of the exchangers 76, 86 with the walls 102,104 removed in the figures.

FIG. 8 illustrates a further cleaning manifold 230 arranged above the exchanger 76. A cleaning manifold 250 is arranged above the exchanger 86 and is a mirror image duplicate of the manifold 230 across the vertical center plane CP of the oven. The manifolds 230, 250 contain a pressurized water and soap mixture or solution.

The manifold 230 has a plurality of nozzles 210 for spraying water and soap mixture or solution S onto the top exchanger bank 76a during a periodic cleaning procedure. Further manifolds arranged between the banks can be used to spray water and soap mixture or solution S onto the banks 76b and 76c respectively. The manifold 250 has a plurality of nozzles 210 arranged to spray water and soap mixture or solution onto the top exchanger bank 86a during a periodic cleaning procedure. Further manifolds arranged between the banks can be used to spray water and soap mixture or solution onto banks 86b and 86c respectively.

FIG. 8 also shows an extension guide plate 260 and an adjustable spoiler plate 266 that is hinged by a plurality of hinges 270 to the extension guide plate 260 arranged between the heat exchanger 76 and the chamber 66. The extension plate 260 and the spoiler plate 266 can be part of the respective wall 103, 105 of an extension thereof and have a vertical length equal to the respective wall 103, 105. An identical extension guide plate and spoiler plate are arranged between the heat exchanger 86 and the chamber 68, configured as a mirror image duplicate of the guide plate 260 and the adjustable spoiler plate 266 across the vertical center plane CP of the oven.

The combination of the two plates 260, 266, with proper adjustment thereof allows for fine tuning of the air flow delivered by the fans 70, 80 to the chambers 66, 68. The hinges 270 include a portion 271 fixed to the extension guide plate 260 and a portion 272 fixed to the spoiler plate 266. The portions 271, 272 are rotatable with respect to each other about a bolt 273, when the bolt is loosened for adjustment of the angle between the plates 260, 266. One the angle is adjusted the bolt 273 is tightened which prevents any further rotation of the plates 260, 266.

Particularly, the air flows circumferentially around the respective drum 44, 48 in the respective chambers 66, 68.

FIGS. 10 and 11 illustrate a vertically arranged steam header 320 that is adjacent the heat exchanger banks 76a, 76b, 76c. The header 320 contains pressurized steam. The header has a plurality of holes 320a arranged spaced-apart in the vertical direction. A mirror image identical header 330 with holes 330a is provided at the outlet of the exchanger 86. Steam under pressure is ejected from the holes 320a, 330a into the air stream downstream of the exchangers 76, 86 such that a proper cooking humidity is maintained in the oven chambers 66, 68.

The plenums 72, 82 are mirror image identical across the vertical center plane CP of the oven. Therefore, only the plenum 82 will be described in detail in FIG. 12.

Figure 12:
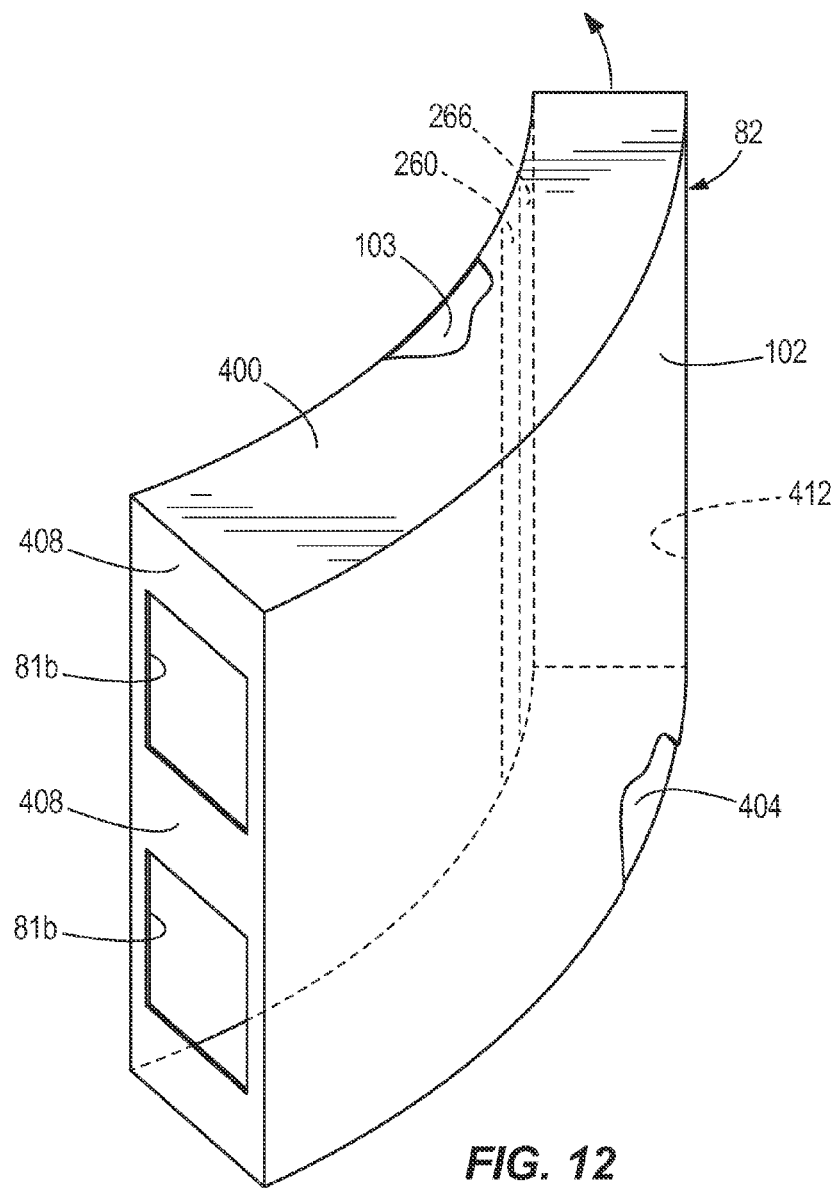
FIG. 12 is a schematic, partially fragmentary perspective view of a plenum taken from FIG. 4.

FIG. 12 illustrates the plenum 82. The plenum includes the curved vertical sidewalls 102, 103 that are substantially concentric with the drum 48. A top wall 400 substantially closes the space between the walls 102, 103 at a top end thereof and a bottom wall 404 substantially closes the space between the walls 102, 103 at a bottom end thereof. A fan chamber wall 408 provides at least one and preferably two outlets 81b, 81b for two fans 80. Although a flat wall 408 is shown in FIG. 12, it is beneficial to provide an expanding or funnel outlet 81d, expanding in a direction away from the fans and toward the heat exchangers in the direction T (FIG. 3) as shown in FIG. 7, to minimize pressure drop. Otherwise, the wall 408 closes an opening defined by the walls 102, 103, 400, 404. An outlet open face 412 defined by the walls 102, 103, 400, 404, at an end opposite the wall 408, allows air to pass from the plenum 82 into the chamber 68. The extension 260, and the spoiler 266, as an adjustable part of inside wall 103, can be adjusted to most effectively direct forced air flow around the circumference of the drum 48. The walls 102, 103, 400, 404 form a curved rectangular tube for directing air in a curved path from the outlets 81b, 81b within the chamber 68. The heat exchanger 86 is contained within the walls 102, 103, 400, 404. The walls 400, 404 can be regions or portions of an overall housing hood and floor respectively.

From the foregoing, it will be observed that numerous variations and modifications may be effected without departing from the spirit and scope of the invention. It is to be understood that no limitation with respect to the specific apparatus illustrated herein is intended or should be inferred.

All references, including publications, patent applications, and patents, cited herein are hereby incorporated by reference to the same extent as if each reference were individually and specifically indicated to be incorporated by reference and were set forth in its entirety herein, to the extent that the references are not inconsistent with the present disclosure.

The invention claimed is:
1. An oven comprising:
a first drum oriented with a first vertical axis and a first motor for rotating the first drum about the axis;
a conveyor belt having a first length helically surrounding the first drum, and having an infeed end and outlet end;
a first chamber defined by walls surrounding the first drum and the first length of the conveyor belt;
a first plenum positioned within the first chamber, curved substantially concentrically with the first drum, and surrounding at least a portion of the first length of the conveyor belt, the first plenum forming a substantially closed air pathway having an inlet at one end and an outlet at an opposite end passing air into the first chamber;
a first fan arranged to circulate air within the first chamber and force air into the first plenum inlet, through the first plenum and out of the first plenum outlet;
a first heat exchanger arranged in the first plenum;
a second drum oriented with a second vertical axis and a second motor for rotating the second drum about the axis;
a conveyor belt having a second length helically surrounding the second drum, and having an inlet end to receive products from the outlet end of the first length and a discharge end;
a second chamber defined by walls surrounding the second drum and the second length of the conveyor belt;
a second plenum within the second chamber and being curved substantially concentrically with the second drum, the second plenum forming a substantially closed air pathway having an inlet and an outlet passing air into the second chamber;
a second fan arranged to circulate air within the second chamber and force air into the second plenum inlet, through the second plenum and out of the second plenum outlet; and
a second heat exchanger arranged in the second plenum;
wherein the first fan is arranged in a fan chamber that has a radially oriented inlet with respect to the first drum and a tangentially oriented outlet with respect to the first drum that is in substantially enclosed air flow communication with the inlet of the first plenum;
wherein the outlet of the first plenum and the fan chamber inlet are arranged to cause air circulated in the first chamber to substantially circulate in a first circular direction around the drum from the first plenum outlet to the fan chamber inlet;
wherein the second fan is arranged in a fan chamber that has a radially oriented inlet with respect to the second drum and a tangentially oriented outlet with respect to the second drum that is in substantially enclosed air flow communication with the inlet of the second plenum; and
wherein the outlet of the second plenum and the fan chamber inlet are arranged to cause air circulated in the second chamber to substantially circulate in a second circular direction around the drum from the second plenum outlet to the fan chamber inlet;
wherein the first and second circular directions are opposite circular directions.

2. The spiral oven according to claim 1, wherein said first heat exchanger has a curvature to conform to the curvature of the first plenum.

3. The spiral oven according to claim 1, wherein said first heat exchanger has a curvature to conform to the curvature of the first plenum and said second heat exchanger has a curvature to conform to the curvature of the second plenum.

4. The spiral oven according to claim 3, wherein the first plenum and the first heat exchanger are shaped in mirror image fashion across a vertical center plane of the oven to the second plenum and the second heat exchanger.

5. The oven according to claim 4, wherein the first and second heat exchangers comprise tubes for containing a hot heat transfer fluid.

6. The oven according to claim 5, wherein the tubes are arranged transversely to the air flow direction across the tubes.

7. The oven according to claim 1, wherein the fan chamber is inside the first chamber; and
   wherein the first fan is driven by an electric motor outside the fan chamber.

8. The oven according to claim 1, wherein the first plenum is in the form of a curved rectangular tube arranged along the outer perimeter of the first chamber.

9. The oven according to claim 8, further comprising an additional fan arranged below the first fan, wherein the first fan and the additional fan are arranged in the fan chamber.

10. The oven according to claim 1, comprising:
    an adjustable spoiler plate that is an extension of an inside wall of the plenum that is closest to the first drum at the plenum outlet and is hinged to the plenum;
    the adjustable spoiler plate adjustable in angle to adjust the direction of re-circulated air flow from the plenum outlet within the first chamber.

11. The oven according to claim 1, comprising:
    a vertically arranged steam header that is adjacent the first heat exchanger;
    the header having a plurality of holes such that steam under pressure is ejected from the holes into the air stream downstream of the first heat exchanger such that a proper cooking humidity is maintained in the first chamber.

12. The oven according to claim 1, further comprising:
    a cleaning manifold arranged above the first heat exchanger, the manifold is configured to contain and dispense a pressurized water and soap mixture or solution during a cleaning operation;
    the manifold includes a plurality of nozzles for spraying water and soap mixture or solution onto the top of the first heat exchanger.

13. The oven according to claim 1, wherein the first plenum is positioned between the first length of conveyor belt and at least one of the walls defining the first chamber.

14. The oven accordingly to claim 1, wherein the first length of conveyor belt has an outer circumference and the first plenum has an inner curvature that substantially conforms to at least a portion of the outer circumference of the first length of the conveyor belt.

* * * * *